(12) United States Patent
Bohner et al.

(10) Patent No.: US 10,161,424 B2
(45) Date of Patent: Dec. 25, 2018

(54) HYDRAULIC ROTARY MANIFOLD

(71) Applicant: 2141632 Ontario Inc., Ingersoll (CA)

(72) Inventors: Stephan E. Bohner, Woodstock (CA); James Luong, Aylmer (CA)

( * ) Notice: Subject to any disclaimer, the term of this patent is extended or adjusted under 35 U.S.C. 154(b) by 0 days.

(21) Appl. No.: 15/415,453

(22) Filed: Jan. 25, 2017

(65) Prior Publication Data

US 2017/0211598 A1    Jul. 27, 2017

Related U.S. Application Data

(60) Provisional application No. 62/287,234, filed on Jan. 26, 2016.

(51) Int. Cl.
| | |
|---|---|
| *F16L 27/00* | (2006.01) |
| *F15B 13/02* | (2006.01) |
| *F16K 31/06* | (2006.01) |
| *F16L 27/093* | (2006.01) |

(52) U.S. Cl.
CPC .......... *F15B 13/022* (2013.01); *F15B 13/024* (2013.01); *F16K 31/06* (2013.01); *F16L 27/093* (2013.01)

(58) Field of Classification Search
USPC ........................................................ 137/580
See application file for complete search history.

(56) References Cited

U.S. PATENT DOCUMENTS

| | | | | |
|---|---|---|---|---|
| 3,125,360 A | * | 3/1964 | Ulrich ................... | F16L 27/093 285/124.5 |
| 3,853,328 A | * | 12/1974 | Pierce .................. | F16J 15/3236 277/589 |
| 3,918,486 A | * | 11/1975 | Cyphelly ............... | F16L 27/08 137/580 |
| 5,372,389 A | * | 12/1994 | Tam ...................... | F16L 27/093 285/147.3 |
| 5,702,130 A | * | 12/1997 | Jostein ................... | F16L 17/10 285/106 |

(Continued)

FOREIGN PATENT DOCUMENTS

WO    2016099372 A1    6/2016

*Primary Examiner* — John Fox
(74) *Attorney, Agent, or Firm* — Brunet & Co. Ltd.; Robert A. H. Brunet; Hans Koenig

(57) ABSTRACT

A hydraulic rotary manifold has a core manifold having a barrel and a rotatable spindle inserted in the barrel. The core manifold is common to a variety of different configurations involving removable spindle-mounted and barrel-mounted manifolds, which may be removably mounted on the core manifold and exchanged for other removable manifolds to provide different hydraulic fluid flow paths in the rotary manifold using the common core manifold. The rotary manifold permits retrofitting a secondary fluid flow path to use a secondary fluid in conjunction with a work tool mounted on the rotary manifold. The rotary manifold permits mounting a rotary position encoder on a barrel-side of the rotary manifold permitting the use of the common core manifold when a rotary position encoder is desired. Electronically actuated cartridge valves may be integrated into the core manifold and/or removable manifolds to provide further customization of the hydraulic fluid flow paths in the rotary manifold and/or to provide cross-over relief paths within the rotary manifold itself.

14 Claims, 8 Drawing Sheets

(56) References Cited

U.S. PATENT DOCUMENTS

| | | | | |
|---|---|---|---|---|
| 5,713,609 | A * | 2/1998 | Mascola | F16L 27/093 |
| | | | | 285/121.3 |
| 8,307,849 | B2 * | 11/2012 | Fuller | B23Q 1/0018 |
| | | | | 137/580 |
| 2007/0024052 | A1 * | 2/2007 | Kawamoto | B66C 23/84 |
| | | | | 285/272 |
| 2010/0209198 | A1 * | 8/2010 | Piper | E21B 33/038 |
| | | | | 405/170 |
| 2015/0003950 | A1 * | 1/2015 | Hren | F16L 3/012 |
| | | | | 414/722 |

* cited by examiner

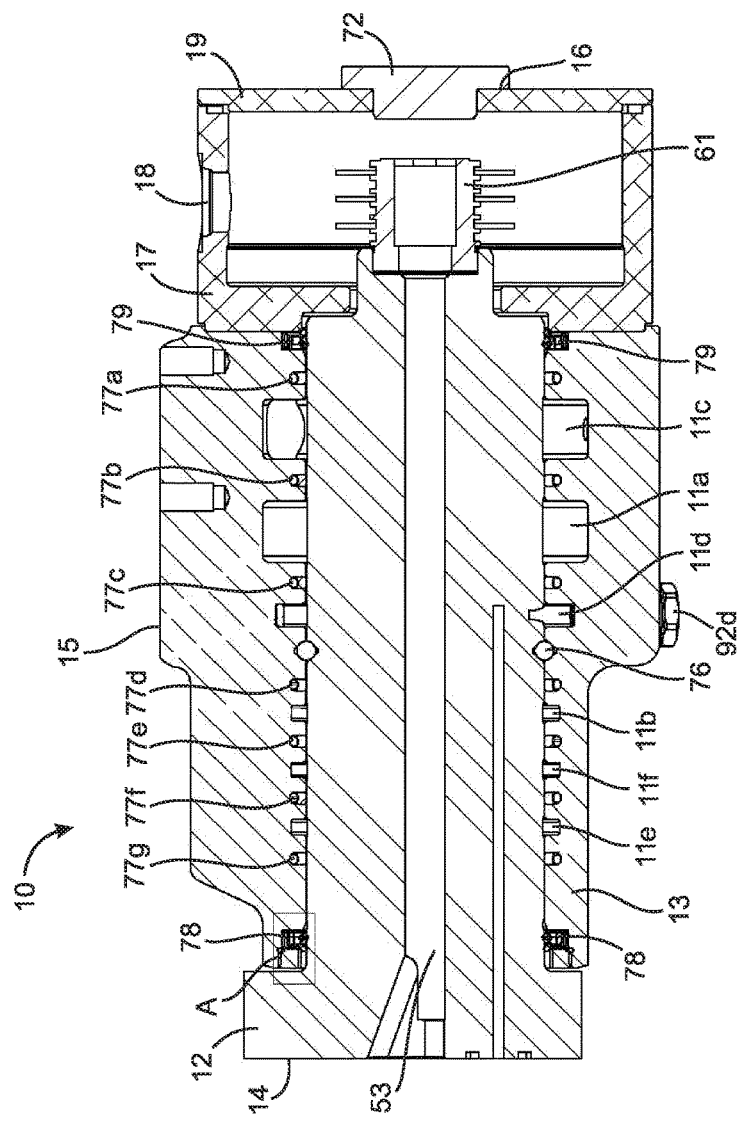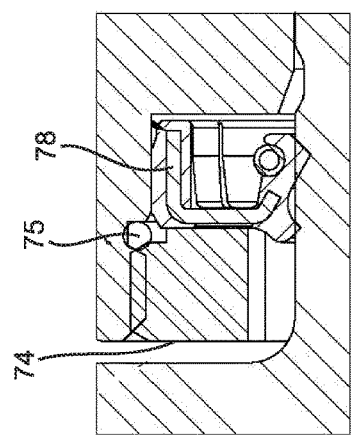
Fig. 2A
Fig. 2B

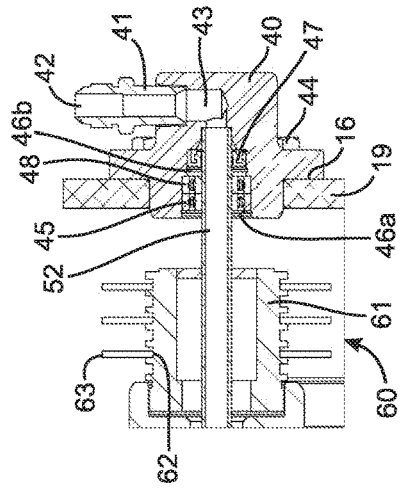
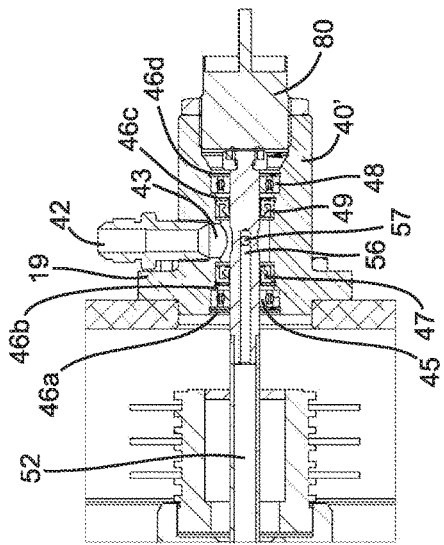
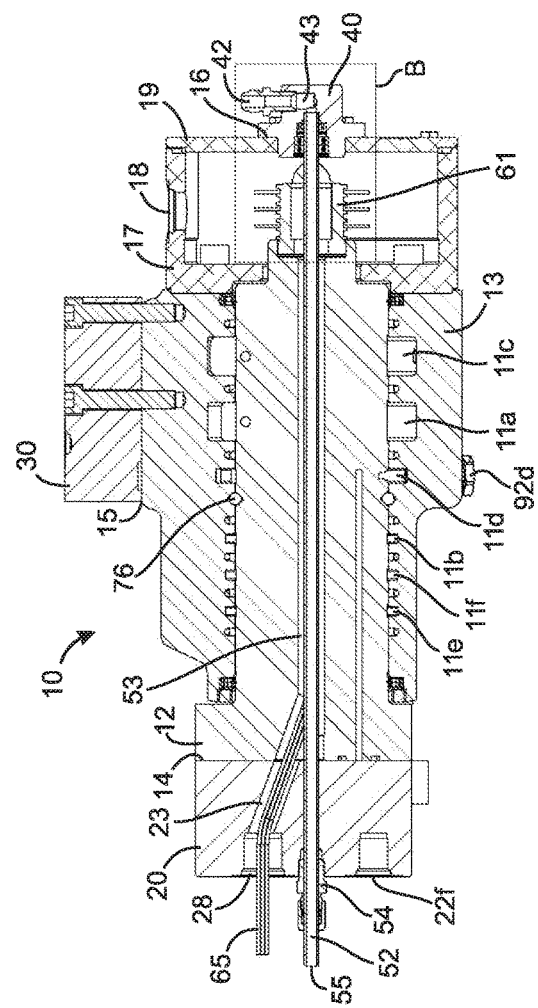
Fig. 3B
Fig. 3C
Fig. 3A

HYDRAULIC ROTARY MANIFOLD

CROSS-REFERENCE TO RELATED APPLICATIONS

This application claims the benefit of U.S. patent application Ser. No. 62/287,234 filed Jan. 26, 2016, which is incorporated herein by reference.

FIELD

This application relates to hydraulic rotary manifolds.

BACKGROUND

A hydraulic rotary manifold can supply hydraulic fluid to a hydraulically-powered work tool while permitting the work tool connection to rotate 360°, which is particularly important for tools such as harvesting heads, harvesting equipment cabins, lift arms, excavators, forestry equipment and the like. A hydraulic rotary manifold typically comprises a spindle that is rotatable within a barrel, where the spindle comprises at least one hydraulic fluid port and the barrel comprises at least one hydraulic fluid port, the hydraulic fluid ports in fluid communication with each other via a fluid flow channel between the spindle and the barrel. The work tool connections are typically mounted on the spindle. With a hydraulic fluid reservoir fluidly connected to the hydraulic fluid ports on the barrel, and actuators associated with the work tool fluidly connected to the hydraulic fluid ports on the spindle, hydraulic fluid from the reservoir may be used to operate the tool, for example to rotationally drive the tool. Because the tool is attached to the spindle of the hydraulic manifold, rotation of the tool causes the spindle to rotate in the barrel.

Hydraulic rotary manifolds are typically custom built for a specific work tool. Fluid flow paths through the spindle and barrel and the number and locations of fluid ports are configured to operate a particular tool. Further, while fluid flow channels in the manifold may be used to carry fluids other than hydraulic fluid, the walls of such channels are made of the same material as the manifold itself (typically carbon steel), and are therefore not suitable for fluids that are incompatible with the manifold material.

There remains a need in the art for hydraulic rotary manifolds that may be configured to operate with a wide variety of work tools and/or may possess an alternative flow path for permitting the flow of alternative fluids through the manifold.

SUMMARY

In one aspect of the present invention, there is provided a configurable hydraulic rotary manifold comprising: a core manifold comprising a barrel and a spindle inserted in the barrel and rotatable with respect to the barrel, the core manifold further comprising a hydraulic fluid flow channel between the spindle and the barrel; and, a plurality of removable manifolds comprising at least a removable spindle-mounted manifold removably mounted on the spindle of the core manifold and a removable barrel-mounted manifold removably mounted on the barrel of the core manifold, the spindle-mounted manifold having a hydraulic fluid port in fluid communication through the hydraulic fluid flow channel of the core manifold with a hydraulic fluid port on the core manifold or the barrel-mounted manifold.

In another aspect of the present invention, there is provided a hydraulic rotary manifold comprising: a barrel and a spindle inserted in the barrel and rotatable with respect to the barrel; a fluid flow channel between the spindle and the barrel permitting flow of hydraulic fluid between the spindle and the barrel; a barrel-mounted manifold mounted on the barrel; a spindle conduit in the spindle for permitting flow of a secondary fluid through the spindle, the spindle conduit having a portion aligned with a central axis of the spindle; and, a seal between the portion of the spindle conduit and the barrel-mounted manifold, the seal permitting rotation between the spindle conduit and the barrel-mounted manifold about the central axis.

In one aspect, the rotary manifold may comprise one or more removable manifolds. Preferably, there is at least one spindle-mounted manifold removably mounted on the spindle of the core manifold. Preferably, there is at least one barrel-mounted manifold removably mounted on the barrel of the core manifold. The removable spindle-mounted manifolds are exchangeable with other removable spindle-mounted manifolds to provide a different configuration of hydraulic fluid ports and/or a different hydraulic fluid flow path on a spindle-side of the core manifold. The barrel-mounted manifolds are exchangeable with other removable barrel-mounted manifolds to provide a different configuration of hydraulic fluid ports and/or a different hydraulic fluid flow path on the barrel-side of the core manifold. The core manifold comprises a generic set of openings that are matched to corresponding generic sets of openings on a face of each of the removable manifolds. However, each of the removable manifolds also comprises a custom configuration for at least one fluid port into or out of which fluid may enter or exit the rotary manifold. The use of removable manifolds with a common core manifold results in a modular rotary manifold that may be customized depending on work tool connections or hoses to be mounted on the spindle, space constraints, hose direction, ease of connection and routing, or any other factor affecting the use of the rotary manifold. Because the core manifold is common to all configurations, it is unnecessary to build custom rotary manifolds entirely from scratch for all applications, thereby reducing overall operational costs.

A given removable manifold may comprise one or more fluid ports. The one or more fluid ports may comprise one or more of hydraulic fluid ports or secondary fluid ports. Hydraulic fluid ports permit hydraulic fluid flow into and out of the removable manifolds in order to operate a hydraulically operated work tool. Usually, hydraulic fluid ports on a given removable manifold are provided in pairs, one to receive hydraulic fluid into the removable manifold and one to allow hydraulic fluid to exit the removable manifold. Hydraulic fluid ports are generally fitted with hydraulic hoses to transport hydraulic fluid to and from the work tool or too and from a hydraulic fluid reservoir. Hydraulic fluid ports on a barrel-mounted manifold may be paired with hydraulic fluid ports on a spindle-mounted manifold so that the barrel-mounted manifold comprises a hydraulic fluid port in fluid communication with the hydraulic fluid port on the spindle-mounted manifold. Hydraulic fluid may flow between the paired ports through corresponding hydraulic fluid channels in the barrel-mounted manifold, core manifold and spindle-mounted manifold.

The core manifold and/or one or more of the removable manifolds may comprise one or more valves, preferably cartridge valves, to provide additional flexibility for customizing fluid flow paths in the rotary manifold and/or to reduce hose runs. The one or more valves may be configured to control fluid flow in one or more hydraulic fluid flow channels. Thus, valve functions may be integrated into the rotary manifold rather than being provided separately.

In one embodiment, the one or more valves may comprise one or more relief valves in one or more hydraulic fluid flow channels. A relief valve may be configured to permit fluid flow from a first hydraulic fluid flow channel to a second hydraulic fluid flow channel through a relief channel in the rotary manifold fluidly connecting the first and second hydraulic flow channels when fluid pressure in the first fluid flow channel reaches or exceeds a predetermined pressure. The relief valve is particularly useful in high pressure flow paths, the relief channel connecting the high pressure flow path to a lower pressure flow path in the rotary manifold. Thus, external pressure relief flow paths are unnecessary and the pressure relief functions in a crossover manner within the rotary manifold itself to prevent damage to seals and work tools when the predetermined pressure is exceeded. The relief valve and relief path may be incorporated into the barrel of the core manifold or into one or more of the removable manifolds.

The one or more valves may comprise one or more electrically actuated valves, for example solenoid valves, in electronic communication with a logic circuit, the logic circuit actuating the one or more electrically actuated valves in response to a condition of the rotary manifold. The condition may comprise one or more of fluid pressure in the hydraulic fluid flow channels, rotational position of the spindle relative to the barrel or status of any other parameter of the rotary manifold. Electrically actuated valves permit logic to be integrated directly into the rotary manifold based on the condition information. The valve or valves in hydraulic fluid flow paths may be selectively opened or closed based on the condition information to permit or prevent fluid flow in selected hydraulic fluid flow paths. For example, when electrically actuated valves are used as relief valves, the valve may be electronically connected to a logic circuit that may selectively open or close one or more of the valves based on pressure information throughout the rotary manifold to provide the best pressure relief in the circumstance. In another example, rotational position information about the spindle provided by a rotary position encoder may be utilized by a logic circuit to activate valves in hydraulic fluid flow paths to different fluid ports to maximize efficient usage of hydraulic fluid and/or to customize hydraulic fluid paths based on work tool function.

A secondary fluid port in fluid communication with a secondary fluid conduit permits the flow of a secondary fluid, for example a liquid or a gas, through the rotary manifold to a work site to assist the work tool in its work. The secondary fluid conduit is preferably a spindle conduit situated through the spindle of the core manifold. The spindle conduit may rotate with the spindle. The spindle conduit may be a conduit bored through the spindle or may be a tube separate from but mounted on the spindle. Preferably, the spindle conduit comprises a separate tube passing through the spindle. The tube may pass through an existing through aperture in the spindle, for example a wiring duct, which permits retrofitting a core manifold with a secondary fluid conduit. Because the spindle conduit rotates with the spindle, at least a portion of the spindle conduit is preferably aligned with a central axis of the spindle. The portion of the spindle conduit may extend into a secondary barrel-mounted manifold, the secondary barrel-mounted manifold having a fluid port in fluid communication with the secondary fluid conduit and with a reservoir of the secondary fluid. In one embodiment, the spindle conduit may comprise a straight tube that passes through the spindle and the barrel to extend into the secondary barrel-mounted manifold. The secondary barrel-mounted manifold may be a removable manifold, if desired. A seal may be mounted on the tube in the secondary barrel-mounted manifold. The seal is preferably located between the spindle and the secondary barrel-mounted manifold to prevent secondary fluid from flowing out of the secondary barrel-mounted manifold outside the secondary fluid conduit. The seal may be between the spindle conduit and the barrel-mounted manifold. The seal permits rotation between the spindle conduit and the secondary barrel-mounted manifold about the central axis. The seal is preferably concentric with the central axis of the spindle. The seal preferably is able to handle continuous rotation under pressure. The secondary fluid is effectively kept away from the core manifold to prevent the secondary fluid from interacting with and possibly damaging the rotary manifold, while at the same time allowing the spindle conduit to rotate with the spindle.

Integrating a secondary fluid flow path through the rotary manifold in a manner as described herein obviates the need to use another set of ports alongside the hydraulic fluid ports and permits the use of special material in only a limited number of components. When secondary fluids are used that are incompatible with the normal manifold material (e.g. carbon steel) it is expensive and impractical to construct an entire manifold from a special material (e.g. stainless steel). In the present rotary manifold, only a secondary fluid conduit, and possibly a secondary barrel-mounted manifold, could be constructed of the special material. Further, the secondary flow path may be retrofitted to manifolds or removed as desired, which permits the rotary manifold to be used in a variety of different applications.

In one embodiment, the secondary fluid may be a corrosive fluid, for example a corrosive liquid for stump treatment to facilitate degradation of wood where the hydraulic work tool is a stump grinder. If required, the secondary fluid port and secondary fluid conduit may comprise a material that is compatible with the secondary fluid. Depending on design, an entire removable secondary manifold configured for delivering the secondary fluid may comprise a material that is compatible with the secondary fluid. Where a corrosive liquid is used as the secondary fluid, the compatible material may comprise stainless steel.

In some embodiments, a rotary electrical connector may be used to facilitate transmission of electrical power through the rotary manifold. The rotary electrical connector may comprise slip rings engaged with the spindle, the slip rings in electrical contact with brushes mounted in the barrel. In one embodiment, the rotary electrical connector may be between the spindle and the secondary barrel-mounted manifold. It is a particular advantage that the rotary electrical connector may be between the spindle and the secondary barrel-mounted manifold, especially in embodiments where the secondary barrel-mounted manifold is a removable manifold. In such embodiments, the hydraulic rotary manifold may be retrofitted with the rotary electrical connector and/or the rotary electrical connector may be easily serviced by removing the secondary barrel-mounted manifold. Further, because the rotary electrical connector is after the spindle but before the secondary barrel-mounted manifold, the rotary electrical connector does not need to be removed to exchange the secondary barrel-mounted manifold with a different secondary barrel-mounted manifold. A single common core manifold may be provided having the capability for transmitting electrical power through the rotary manifold when desired, while also permitting the use of a variety of removable manifolds where electrical power transmission is not required.

In some embodiments, a rotary position encoder may be used to determine the rotational position of the spindle relative to the barrel. It is an advantage of the rotary manifold that the rotary position encoder may be mounted on a barrel-side of the rotary manifold and operatively engaged with the portion of the spindle conduit to encode rotation of the spindle. Thus, the rotary electrical connector may be located between the rotary position encoder and the spindle at the barrel-side of the rotary manifold, which permits the addition of the rotary position encoder after the addition of other structures at the barrel-side, such as the secondary barrel-mounted manifold. By separating the rotary position encoder from the rotary electrical connector, it is possible to have the secondary fluid flow path pass through the rotary electrical connector without losing the potential for encoder function, and it is possible to retrofit additional structure for secondary fluid flow capability on to an existing rotary manifold.

The rotary manifold may be used in conjunction with a work tool that relies on rotation to perform the work. Such work tools include, for example, harvesting heads, harvesting equipment cabins, lift arms excavators, forestry equipment and the like. The work tool is typically mounted on the spindle or the spindle-mounted manifold and rotation of the work tool powered by hydraulic fluid causes rotation of the spindle.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 2A depicts a side cross-sectional view of a core manifold of the hydraulic rotary manifold of FIG. 1.

FIG. 2B depicts a magnified view of detail A in FIG. 2A.

FIG. 3A depicts a side cross-sectional view along a central longitudinal axis of the manifold of FIG. 1.

FIG. 3B depicts a magnified view of detail B in FIG. 3A.

FIG. 3C depicts an alternate embodiment of the detail of FIG. 3B including a rotary position encoder.

DETAILED DESCRIPTION

Figure 1A:
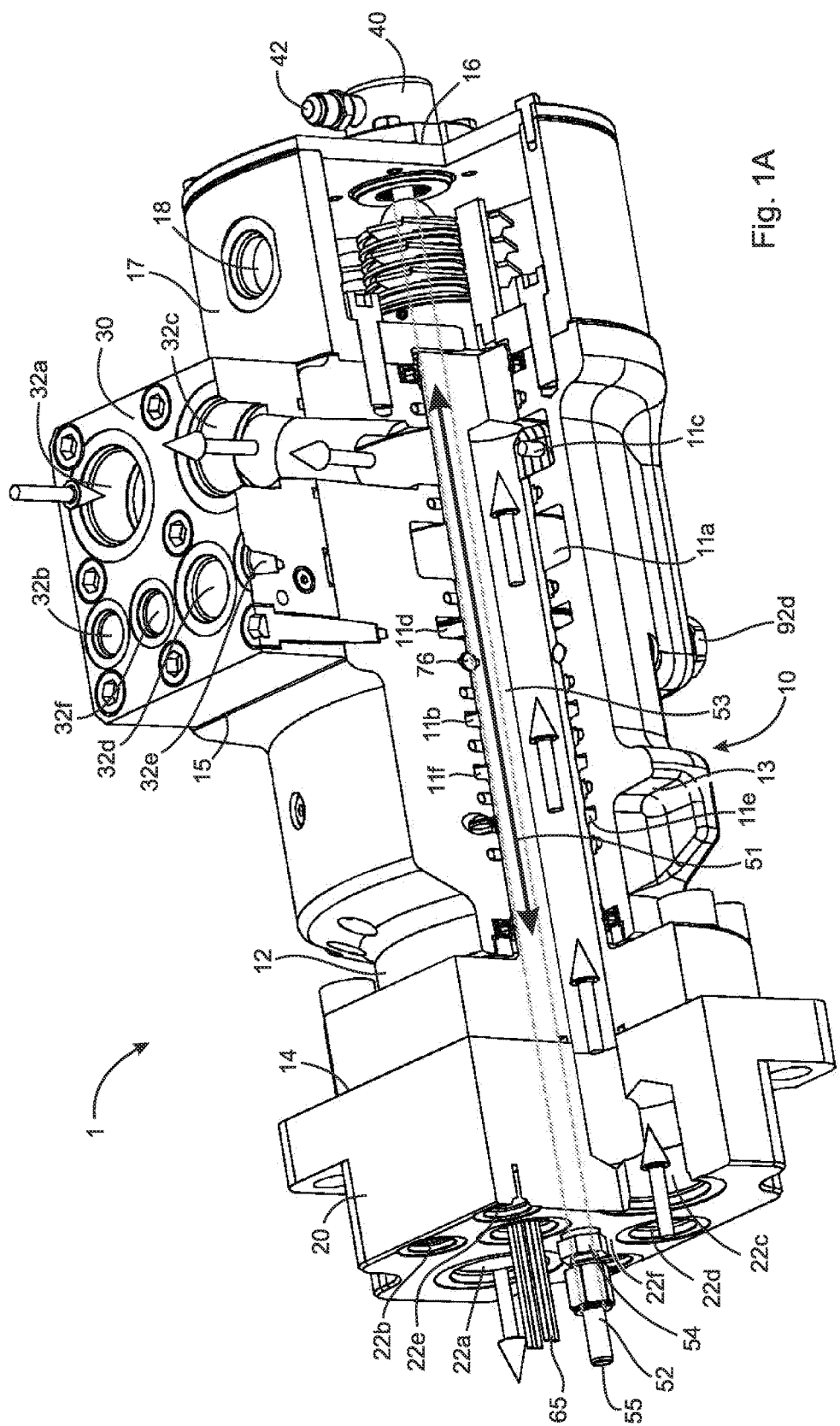
FIG. 1A depicts a perspective view of a hydraulic rotary manifold in accordance with the present invention.

Referring generally to the Figures, a hydraulic rotary manifold 1 may comprise a core manifold 10, a removable spindle-mounted manifold 20, a removable first barrel-mounted manifold 30 and a removable second barrel-mounted manifold 40. The core manifold 10 may comprise a spindle 12 rotatably inserted in a barrel 13. The spindle-mounted manifold 20 may be removably mounted on the spindle 12 at an interface 14 between the spindle 12 and the spindle-mounted manifold 20. The first barrel-mounted manifold 30 may be removably mounted on the barrel 13 at an interface 15 between the barrel 13 and the first barrel-mounted manifold 30. The second barrel-mounted manifold 40 may be removably mounted on the barrel 13 at an interface 16 between the barrel 13 and the second barrel-mounted manifold 40. The removable manifolds 20, 30, 40 may be removably mounted on the core manifold 10 in any suitable manner, for example with bolts, clips, pins and the like. The manifolds 10, 20, 30 may be made of any material suitable for rotary manifolds, for example ductile iron, carbon steel, stainless steel and the like, although from a cost perspective carbon steel is typically used. As will be discussed further below, the second barrel-mounted manifold 40 is preferably made of a material that is compatible with a secondary fluid that flows through a secondary flow path 51 in the rotary manifold 1.

The first barrel-mounted manifold 30 may comprise hydraulic fluid channels in fluid communication with corresponding hydraulic fluid channels 11a-f in the core manifold 10.

The spindle-mounted manifold 20 may comprise hydraulic fluid channels in fluid communication with corresponding hydraulic fluid channels 11a-f in the core manifold 10 thereby fluidly connecting the hydraulic fluid channels in the removable spindle-mounted manifold 20 to the corresponding hydraulic fluid channels in the removable first barrel-mounted manifold 30. Each of the six hydraulic fluid pathways formed from alignment of the hydraulic fluid channels in the spindle-mounted manifold 20, core manifold 10 and first barrel-mounted manifold 30 may permit flow of hydraulic fluid between a hydraulic fluid reservoir (not shown) fluidly connected, for example by hoses, to corresponding hydraulic fluid ports 32a-f on the first barrel-mounted manifold 30 and a hydraulic work tool (not shown) mounted on and fluidly connected to hydraulic fluid ports 22a-f on the spindle-mounted manifold 20. The hydraulic fluid ports 32a-f on the first barrel-mounted manifold 30 form termini of the hydraulic fluid channels in the first barrel-mounted manifold 30. The hydraulic fluid ports 22a-f on the spindle-mounted manifold 20 form termini of the hydraulic fluid channels in the barrel-mounted manifold 30. Valves in the rotary manifold 1 may be used to control hydraulic fluid flow in one or more of the hydraulic fluid flow pathways. For example, valve 92d may control hydraulic fluid flow in the fluid pathway between hydraulic fluid port 32d and 22d. One or more drains in the rotary manifold 1, particularly the core manifold 10, for example drain port 91c (see FIG. 6A and FIG. 6B) fluidly connected to hydraulic fluid channel 11c, may be used to drain hydraulic fluid from the rotary manifold 1. Although six hydraulic fluid pathways are illustrated, there may be any number of hydraulic fluid pathways depending on the desired uses of the rotary manifold.

Figure 1B:
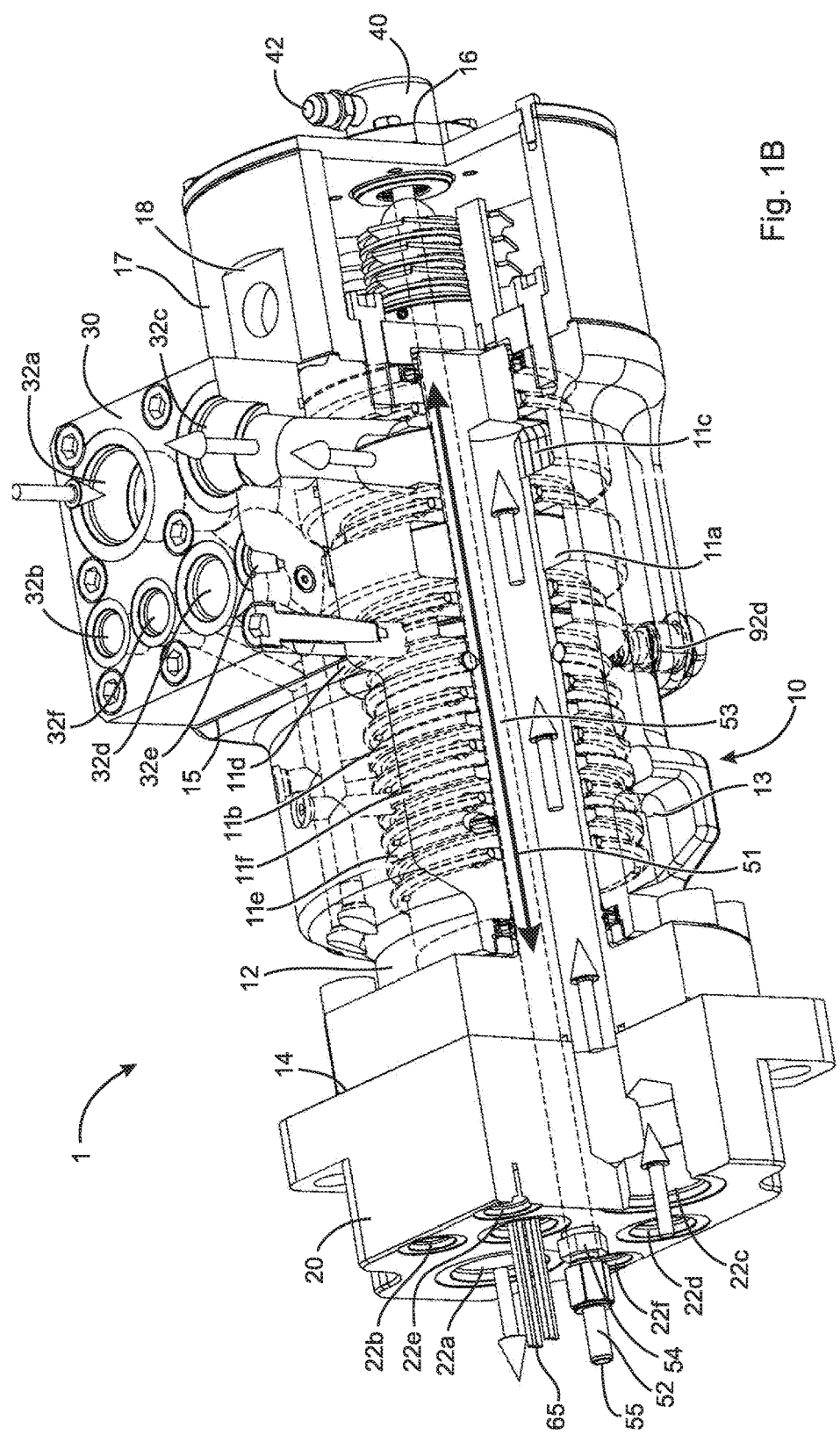
FIG. 1B depicts a view of the hydraulic rotary manifold of FIG. 1A with more internal elements visible.

The second barrel-mounted manifold 40 may comprise a fluid port 42 to permit flow of a secondary fluid from a secondary fluid reservoir (not shown) through the second barrel-mounted manifold 40 and then through the rotary manifold 1 along the secondary flow path 51. The secondary flow path 51 may be in a secondary fluid tube 52, at least a portion of which is aligned with a central axis of the spindle 12. In the embodiment shown, the tube 52 is straight, the entire length of the tube being aligned with the central axis of the spindle 12. The tube 52 may be made of a material compatible with the secondary fluid and may be located within a wiring duct 53 of the rotary manifold 1. In some embodiments, the wiring duct 53 itself may be used as the secondary fluid flow path, but an inside surface of the duct may need to be lined with a material compatible with the secondary fluid depending on the nature of the secondary fluid. For example, if the secondary fluid comprises a corrosive liquid, e.g. for stump treatment, the tube 52 or a lining of the wiring duct 53 may comprise stainless steel. Further, the use of a separate tube inserted into the wiring duct permits retrofitting a single rotary manifold for use with a variety of secondary fluids. In other embodiments, there may be no wiring duct. In the embodiment shown, the tube 52 is concentrically aligned with the central axis of the spindle 12, the tube 52 extending through the spindle-mounted manifold 30 into the spindle 12, out of the spindle 12 into the barrel 13, and then out of the barrel 13 into the second barrel-mounted manifold 40, where the tube 52 is in fluid communication with a void 43 (not shown in FIG. 1) in the second barrel-mounted manifold 40, the void 43 in fluid communication with the fluid port 42. Secondary fluid may flow from the secondary fluid reservoir to the fluid port 42 into the void 43 into the tube 52 and then out through an outlet 55 of the tube 52. The tube 52 may be mounted to the spindle-mounted manifold 30, for example with a compression fitting 54, so that the tube 52 rotates as the spindle 12 rotates. Further details are discussed below in connection with FIG. 3B.

Figure 5:
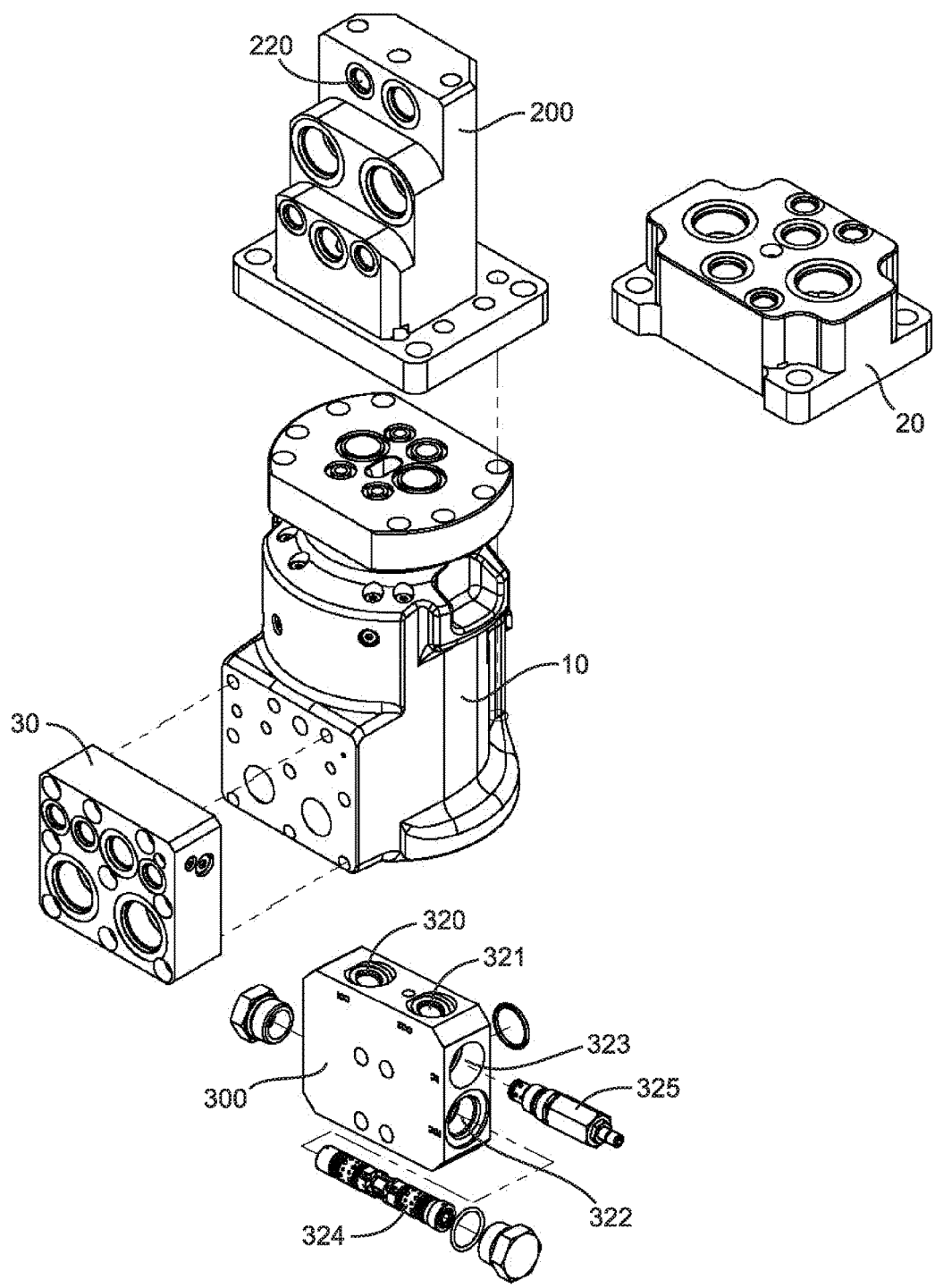
FIG. 5 depicts various removable manifold mount options for the hydraulic rotary manifold of FIG. 1.

The hydraulic fluid channels 11*a-f* may open out of the core manifold 10 through apertures at interfaces 14, 15 where the spindle-mounted manifold 20 and the first barrel-mounted manifold 30 are mounted on the core manifold 10. Such apertures in the core manifold 10 are aligned with corresponding apertures in the spindle-mounted manifold 20 and the first barrel-mounted manifold 30 so that the hydraulic fluid channels 11*a-f* are in fluid communication with the hydraulic fluid channels in the spindle-mounted manifold 20 and first barrel-mounted manifold 30. At the interfaces 14, 15, the arrangement of the apertures in the core manifold 10, spindle-mounted manifold 20 and first barrel-mounted manifold 30 are the same regardless of the removable manifolds mounted on the core manifold 10. However, because the removable manifolds 20, 30, 40 are removable, the spindle-mounted manifold 20 and first barrel-mounted manifold 30 may be exchanged for other removable manifolds having different arrangements of hydraulic fluid ports to permit different configurations of the rotary manifold 1 depending on the work tool being mounted on the rotary manifold 1 and/or a desired scheme for configuring hoses or other features associated with the rotary manifold 1. FIG. 5 illustrates some different configurations. Further, the second barrel-mounted manifold 40 may be exchanged for a different manifold suitable for a different secondary fluid or a different configuration of the rotary manifold 1, or may be exchanged for a sealing cap in the event that no secondary fluid is to be used. Thus, removable manifolds as part of a single rotary manifold permit the reuse of a single core manifold for multiple applications, reducing the overall cost of operating a number of different hydraulic work tools. Thus, the removable manifolds permit customization of a hydraulic rotary manifold.

With especial reference to FIG. 2A and FIG. 2B, the spindle 12 may be rotatably supported in the barrel 13 of the core manifold 10 by retainer bearing 76. Low pressure seals 78, 79 on the barrel 13 proximate ends of the spindle 12 may provide sealing against fluid leaks between the spindle 12 and barrel 13. The seals 78, 79 are preferably low pressure dynamic rotary seals, which may comprise spring-loaded cups to pressurize the seals without clamping the spindle 12. As illustrated in FIG. 2B, the seal 78 may be used in conjunction with an O-ring 75 and a lock ring 74. High pressure seals 77*a-g* may be used to fluidly isolate fluid flow channels 11*a-f*. The high pressure seals 77*a-g* are preferably high pressure dynamic rotary seals, which may comprise spring-loaded cups to pressurize the seals without clamping the spindle 12. The pressure of all the dynamic rotary seals may be finely adjusted to permit sealing without clamping the spindle 12. Such dynamic rotary seals are commercially available, for example the LOCSEAL™ from Hydra Dyne Technology Inc.

The hydraulic rotary manifold 1 may be configured to permit electrical connection between the work tool connected to the the spindle-mounted manifold 20 and an electrical power source located either externally from or internally in the hydraulic rotary manifold 1. In addition to a hydraulic fluid supply, the work tool may also require an electrical supply to power one or more of the tool's functions. With especial reference to FIG. 3A and FIG. 3B, in one embodiment a rotary electrical connector 60 comprising a slip ring head 61 mounted on the spindle 12 located in an electrical housing 17 of the barrel 13 may provide a way of transmitting electricity from a power source to the work tool while permitting rotation of the spindle 12 in the barrel 13. The slip ring head 61 may comprise conductive slip rings 62 (only one labeled) in grooves in the slip ring head 61. The slip rings 62 may be in contact with conductive brushes 63 (only one labeled) mounted in the electrical housing 17. As the spindle 12 rotates in the barrel 13, the slip rings 62 rotate with the spindle 12 but remain in electrical contact with the brushes 63, the brushes 63 not rotating due to being mounted in the electrical housing 17 of the barrel 13. The brushes 63 may be electrically connected to an external power supply (not shown) by wires (not shown) extending out of the electrical housing 17 though first electrical port 18. Wires 65 electrically connected to the slip rings 62 may be routed through the wiring duct 53 and out an aperture in the spindle 12 into a corresponding aperture in the spindle-mounted manifold 20 at the interface 14. The wires may be further routed through a wiring duct continuation 23 in the spindle-mounted manifold 20 exiting at a second electrical port 28 in the spindle-mounted manifold 20. The wires may then be connected to appropriate terminals on the work tool. Access to the rotary electrical connector 60 in the electrical housing 17 may be obtained by removing an electrical housing cover plate 19 bolted to the electrical housing 17.

Modularity of the hydraulic rotary manifold 1 is particularly advantageous when the hydraulic rotary manifold 1 is configured to permit electrical connection as described above. In the event that it is desirable to transport a secondary fluid through the hydraulic rotary manifold 1, the present modular hydraulic rotary manifold 1 permits retrofitting the hydraulic rotary manifold 1 instead of needing to construct an entirely new rotary manifold. With specific reference to FIG. 3B and FIG. 4A, the cover plate 19 of electrical housing 17 of the barrel 13 may be provided with a mounting port 71 at the interface 16 between the barrel 13 and the second barrel-mounted manifold 40. The mounting port 71 may be configured to permit removable mounting of the second barrel-mounted manifold 40 when a secondary fluid is desired or a sealing cap 72 (see FIG. 2A) when no secondary fluid is desired. It should be understood that a similar configuration may still be used on a face of the barrel 13 when the barrel 13 does not comprise the electrical housing 17. The second barrel-mounted manifold 40 may be secured in the mounting port 71 in any suitable manner, for example with bolts 44 (only one labeled). The second barrel-mounted manifold 40 may receive and rotatably support the secondary fluid tube 52, the tube 52 having been inserted through the spindle-mounted manifold 20, the wiring duct 53 and the slip ring head 61. The tube 52 may be mounted in the spindle-mounted manifold 20 by virtue of the compression fitting 54 so that the tube 52 rotates with the spindle 13. The tube 52 may be rotatably supported in the second barrel-mounted manifold 40 by bearings 45, 48, the bearings 45, 48 retained in the second barrel-mounted manifold 40 by first and second retainer rings 46a, 46b. The secondary fluid may flow both ways between the fluid port 42 and the tube 52 through the void 43 formed in the second barrel-mounted manifold 40. A compression fitting 41 prevents secondary fluid from escaping around the fluid port 42 and a seal 47 prevents secondary fluid from escaping around the tube 52 into the bearings 45, 48. The seal 47 may be any suitable seal; however a low pressure dynamic rotary seal is preferred. The low pressure dynamic rotary seal may comprise a spring-loaded cup to pressurize the seal and pressure may be finely adjusted to permit sealing without clamping the rotating tube 52. Such dynamic rotary seals are commercially available, for example the Enviro Seal™ from Hydra Dyne Technology Inc. Because the void 43 in the second barrel-mounted manifold 40 contains the secondary fluid, the second barrel-mounted manifold 40 is preferably made of a material compatible with the secondary fluid. For example, when the secondary fluid is a corrosive stump treatment oil for use in conjunction with a stump grinder, the second barrel-mounted manifold 40 is preferably made of stainless steel.

Figure 4A:
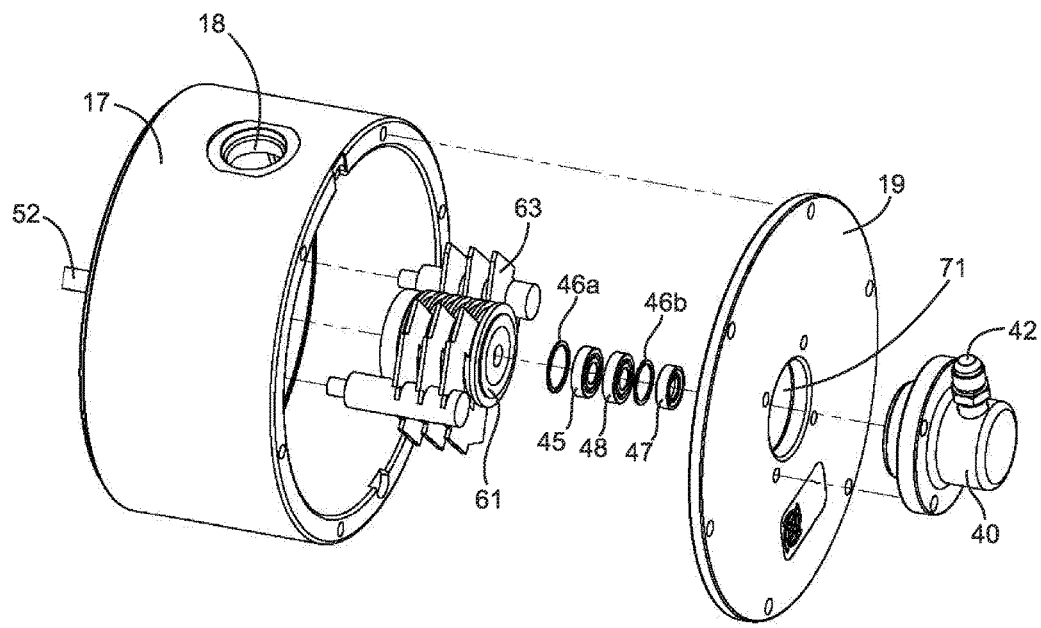
FIG. 4A depicts an exploded view of a secondary barrel-mounted manifold not including a rotary position encoder.
Figure 4B:
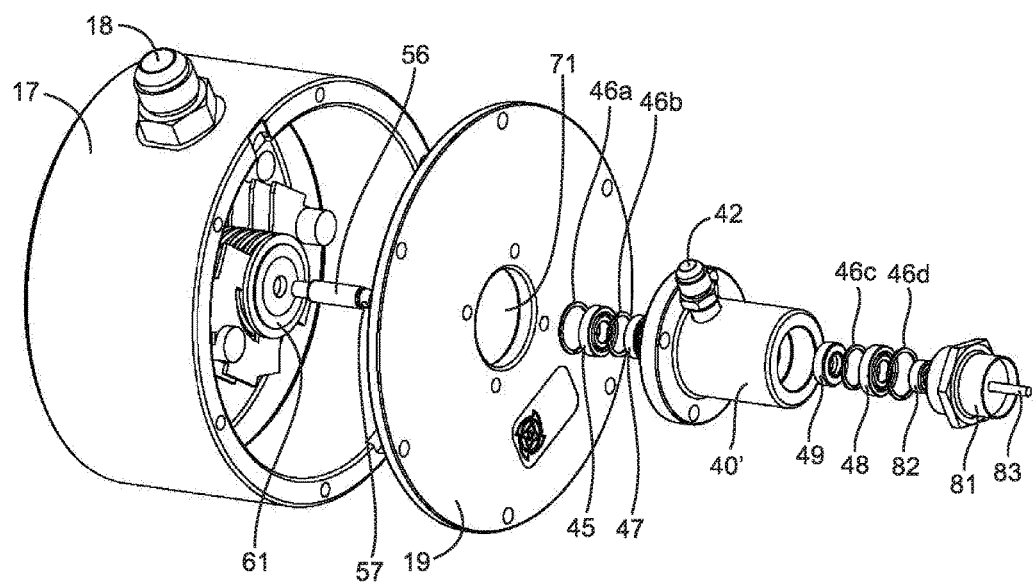
FIG. 4B depicts an exploded view of a secondary barrel-mounted manifold including a rotary position encoder.

FIG. 3C and FIG. 4B illustrate an alternate embodiment of the detail shown in FIG. 3B and FIG. 4A, wherein a rotary position encoder 80 comprising an encoder body 81 and an encoder magnet 82 may be included with an alternate embodiment of a second barrel-mounted manifold 40'. Many of the elements of the embodiment shown in FIG. 3C and FIG. 4B are the same as elements shown in FIG. 3B and FIG. 4A, and the same reference numerals have been used where appropriate in FIG. 3B and FIG. 4A. However, when the rotary position encoder 80 is present, the secondary fluid tube 52 may be provided with a secondary fluid tube extension 56, the tube extension 56 having a radially oriented outlet 57 aligned with the void 43 and therefore the fluid port 42. The tube extension 56 may be attached to secondary fluid tube 52 in any suitable manner, for example by sealing, soldering, welding or the like. The encoder magnet 82 may be mounted on the tube extension 56, for example by friction, compression or the like. Rotation of the tube 52 due to rotation of the spindle 12 causes the tube extension 56 to rotate, thereby causing rotation of the encoder magnet 82 mounted thereon. Rotation of the encoder magnet 82 induces an electrical signal to be propagated in an electrical contact 83 of the rotary position encoder 80, the electrical signal providing rotational or positional information about the spindle 12 to a logic circuit.

Further, the bearing 48 may be moved to the other side of the void 43 to rotatably support the tube extension 56. Third and fourth retainer rings 46c, 46d may be used to retain the bearing 48 in the second barrel-mounted manifold 40'. To prevent secondary fluid from leaking into the rotary position encoder 80 and the bearing 48, another seal 49 of the same construction as the seal 47 may be situated between the void 43 and the third retaining ring 46c. In this configuration, the rotary position encoder 80 may be rotationally coupled to the spindle 12 or the spindle-side of the rotary manifold 1 by virtue of the encoder magnet 82 being mounted on the tube extension 56, while the encoder body 81 and other components of the rotary position encoder 80 may be mounted to the barrel 13 or barrel-side of the rotary manifold 1. The embodiment shown in FIG. 3C and FIG. 4B further illustrates the flexibility of the present modular rotary manifold to be customized to accommodate various configurations and functionalities without the need for a redesign of the core manifold.

As previously described, the rotary manifold 1 is modular comprising a common core manifold 10 and removable manifolds that may be exchanged for other removable manifolds having different arrangements of hydraulic fluid ports to permit different configurations of the rotary manifold 1 depending on the work tool being mounted on the rotary manifold 1 and/or a desired scheme for configuring hoses or other features associated with the rotary manifold 1. FIG. 5 illustrates some different possible configurations. For example, the spindle-mounted manifold 20 having hydraulic fluid ports arranged for top hose routing may be exchanged for a spindle-mounted manifold 200 having hydraulic fluid ports 220 (only one labeled) arranged for side hose routing or other spindle-mounted manifolds with other angular configurations. Such a new configuration would be useful when space constraints do not permit routing hoses out the top of the rotary manifold 1. In another example, the first barrel-mounted manifold 30 having hydraulic fluid ports for many hoses may be exchanged for a barrel-mounted manifold 300 having fewer hydraulic fluid ports 320, 321 for fewer hoses but having valve ports 322, 323 configured to receive valves, especially cartridge valves 324, 325. The cartridge valves 324, 325 may be controlled to open or close hydraulic fluid paths and/or to customize hydraulic fluid paths depending on the work tool being connected to the rotary manifold. Valves, especially cartridge valves, may also be integrated into the other removable manifolds and/or the core manifold. The valves may be controlled manually, by fluid pressure or electronically. In one embodiment, electrically actuated solenoid valves may be used to selectively actuate valves in the fluid flow path based on rotational position information about the spindle relative to the barrel received from a rotary position encoder.

Figure 6A:
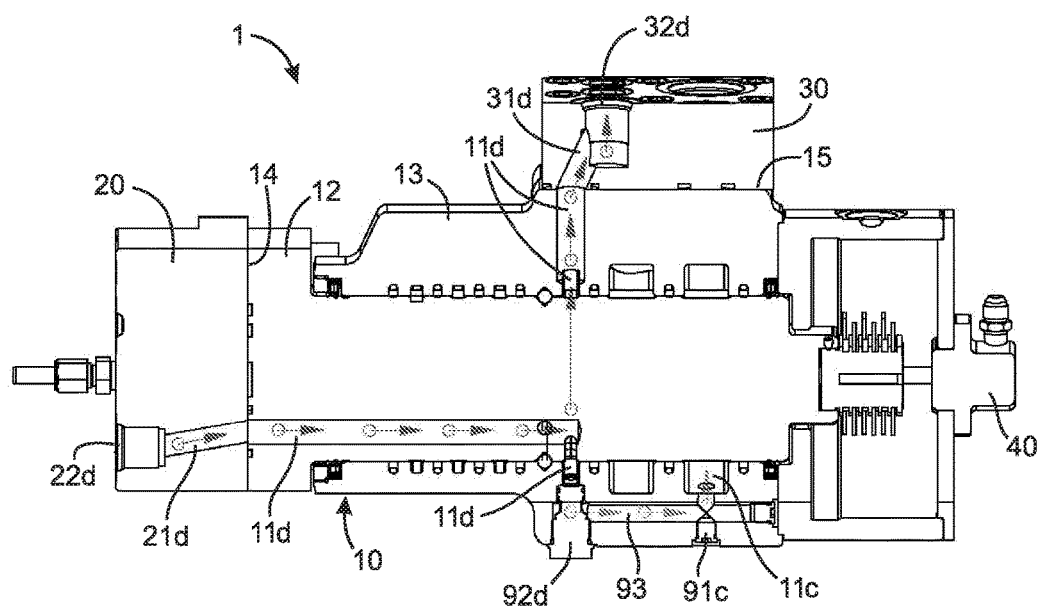
FIG. 6A depicts a side cross-sectional view of the hydraulic rotary manifold of FIG. 1 illustrating use of a check valve and relief flow path for hydraulic fluid in the manifold.
Figure 6B:
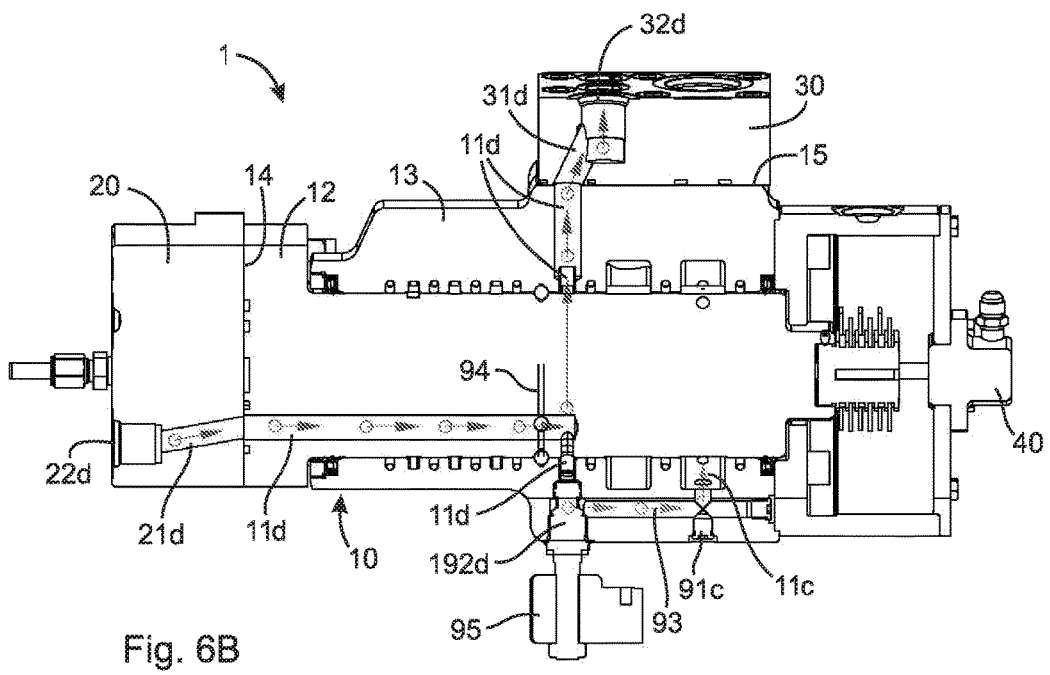
FIG. 6B depicts a side cross-sectional view of the hydraulic rotary manifold of FIG. 1 illustrating use of a solenoid valve and relief flow path for hydraulic fluid in the manifold.

In some embodiments as illustrated in FIG. 6A and FIG. 6B, valves, for example cartridge valves, may be used to provide relief paths for hydraulic fluid in the rotary manifold 1. More than one valve in the same hydraulic fluid channel and/or one or more valves in other hydraulic fluid channels may be used. The provision of a relief path in the rotary manifold 1 reduces hose runs and helps prevents damage to a hydraulic motor or actuator operating the work tool. FIG. 6A illustrates a check valve 92d while FIG. 6B illustrates an electronically controlled solenoid valve 192d for providing a relief path for the hydraulic fluid channel 11d in the core manifold 10. In both FIG. 6A and FIG. 6B, hydraulic fluid returning from a work tool (not shown) enters the rotary manifold 1 through the hydraulic fluid port 22d of the spindle-mounted manifold 20. The hydraulic fluid flows through hydraulic fluid channel 21d in the spindle-mounted manifold 20 passing into the corresponding fluid flow channel 11d in the core manifold 10 at the interface 14 between the spindle-mounted manifold 20 and the core manifold 10. The hydraulic fluid normally flows in the fluid channel 11d in the direction of the arrows passing from the spindle 12 into the barrel 13 and then out of the core manifold 10 into a hydraulic fluid channel 31d in the barrel-mounted manifold 30 at the interface 15 between the core manifold 10 and the barrel-mounted manifold 30. The hydraulic fluid may be returned to the hydraulic fluid reservoir (not shown) by passing out through the hydraulic fluid port 32d into a hose (not shown) connecting the hydraulic fluid port 32d to the hydraulic fluid reservoir. The valve 92d or 192d is normally configured to permit hydraulic fluid in the manner described above. The valves 92d and 192d may be positioned advantageously to control fluid flow where the fluid channel 11d crosses over from the spindle 12 to the barrel 13. Integral valving simplifies the hydraulic circuit.

When the valve is the check valve 92d as illustrated in FIG. 6A, the check valve 92d may be actuated when fluid pressure in the fluid channel 11d increases to a predetermined pressure. When the fluid pressure in the fluid channel 11d reaches or exceeds the predetermined pressure due to blockage of the work tool, the check valve 92d may open to permit hydraulic fluid to flow into a cross-over relief channel 93. The relief channel 93 may be in fluid communication with the fluid channel 11c, which is larger than the fluid channel 11d and may be able to accommodate more hydraulic fluid thereby lowering the pressure in the fluid channel 11d. Once the fluid pressure in the fluid channel 11d drops below the predetermined pressure, the check valve 92d may close.

When the valve is the electronically controlled solenoid valve 192d as illustrated in FIG. 6B, the solenoid valve may be actively controlled with a logic circuit 95, for example a programmable logic circuit (PLC), to respond to different conditions in the rotary manifold 1. A pressure sensor 94 in electronic communication with the logic circuit 95 may be included to provide fluid pressure information to the logic circuit 95. The logic circuit 95 may be programmed to open and close the solenoid valve 192d under preprogrammed pressure conditions. For example, the logic circuit 95 may be programmed to open the solenoid valve 192d when the fluid pressure in fluid channel 11d reaches or exceeds a predetermined pressure to permit hydraulic fluid to flow from the fluid channel 11d into the cross-over relief channel 93 thereby reducing the fluid pressure in the fluid channel 11d. Once the fluid pressure in the fluid channel 11d drops below a certain pressure, the logic circuit 95 may close the solenoid valve 192d.

Figure 7:
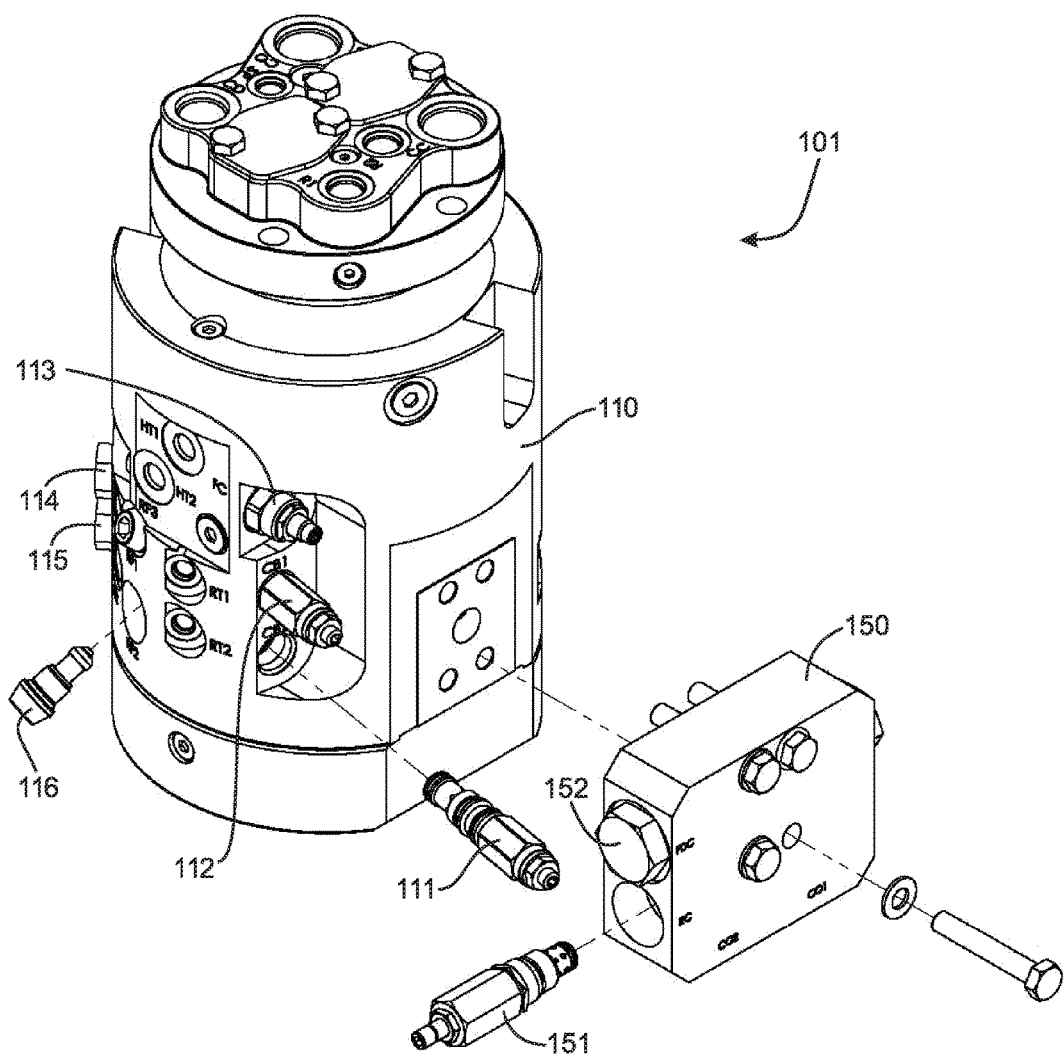
FIG. 7 depicts a core manifold of a hydraulic rotary manifold illustrating how cartridge valves may be integrated therein.

As illustrated in FIG. 7, in one embodiment, a hydraulic rotary manifold 101 may be provided with a plurality of valves, especially cartridge valves 111, 112, 113, 114, 115, 116, 151, 152, to control fluid flow in the rotary manifold 101 for a variety of purposes. The cartridge valves may be integrated into a core manifold 110 of the rotary manifold 101 as shown for valves 111, 112, 113, 114, 115, 116, or may be integrated into a removable manifold 150 as illustrated for valves 151, 152, the removable manifold 150 removably mountable on the core manifold 110. The cartridge valves 111, 112, 113, 114, 115, 116, 151, 152 integrated into the rotary manifold 1 serve to reduce hose runs, and where electrically actuated solenoid valves are used, flow path logic may be built directly into the rotary manifold 1. Position information from a rotary position encoder may be transmitted to the solenoid valves, preferably intermediated by a programmable logic circuit, the solenoid valves being opened and closed in response to the rotational position of the spindle in the barrel to open and close certain fluid flow paths, thereby customizing fluid flow in and providing greater versatility to the rotary manifold 101.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A configurable hydraulic rotary manifold comprising:
   a core manifold comprising a barrel and a spindle inserted in the barrel and rotatable with respect to the barrel, the core manifold further comprising a hydraulic fluid flow channel between the spindle and the barrel;
   a plurality of removable manifolds comprising at least a removable spindle-mounted manifold removably mounted on the spindle of the core manifold and a removable barrel-mounted manifold removably mounted on the barrel of the core manifold, the spindle-mounted manifold having a hydraulic fluid port in fluid communication through the hydraulic fluid flow channel of the core manifold with a hydraulic fluid port on the core manifold or the barrel-mounted manifold; and,
   one or more cartridge valves integrated into the core manifold configured to control fluid flow in the hydraulic fluid flow channel.

2. The rotary manifold according to claim 1, wherein the one or more cartridge valves comprise one or more electrically actuated valves in electronic communication with a logic circuit, the logic circuit actuating the one or more electrically actuated valves in response to a condition of the rotary manifold.

3. The rotary manifold according to claim 2, wherein the condition comprises fluid pressure in the hydraulic fluid flow channel, rotational position of the spindle relative to the barrel or a combination thereof.

4. The rotary manifold according to claim 1, wherein the hydraulic fluid flow channel comprises first and second hydraulic flow channels, and the one or more cartridge valves comprises at least one relief valve configured to permit fluid flow from the first hydraulic flow channel to the second hydraulic flow channel through a relief channel in the rotary manifold fluidly connecting the first and second hydraulic flow channels when fluid pressure in the first fluid flow channel reaches or exceeds a predetermined pressure.

5. A configurable hydraulic rotary manifold comprising:
   a core manifold comprising a barrel and a spindle inserted in the barrel and rotatable with respect to the barrel, the core manifold further comprising a hydraulic fluid flow channel between the spindle and the barrel; and,
   a plurality of removable manifolds comprising at least a removable spindle-mounted manifold removably mounted on the spindle of the core manifold and a removable barrel-mounted manifold removably mounted on the barrel of the core manifold, the spindle-mounted manifold having a hydraulic fluid port in fluid communication through the hydraulic fluid flow channel of the core manifold with a hydraulic fluid port on the core manifold or the barrel-mounted manifold,
   wherein the spindle-mounted manifold is exchangeable with another removable spindle-mounted manifold to provide a different configuration of hydraulic fluid ports and/or a different hydraulic fluid flow path on a spindle-side of the core manifold, and the barrel-mounted manifold is exchangeable with another removable barrel-mounted manifold to provide a different configuration of hydraulic fluid ports and/or a different hydraulic fluid flow path on the barrel-side of the core manifold.

6. A configurable hydraulic rotary manifold comprising:
a core manifold comprising a barrel and a spindle inserted in the barrel and rotatable with respect to the barrel, the core manifold further comprising a hydraulic fluid flow channel between the spindle and the barrel;
a plurality of removable manifolds comprising at least a removable spindle-mounted manifold removably mounted on the spindle of the core manifold and a removable barrel-mounted manifold removably mounted on the barrel of the core manifold, the spindle-mounted manifold having a hydraulic fluid port in fluid communication through the hydraulic fluid flow channel of the core manifold with a hydraulic fluid port on the core manifold or the barrel-mounted manifold; and,
a spindle conduit configured to permit flow of a secondary fluid through the spindle, the spindle conduit having a portion aligned with a central axis of the spindle.

7. The rotary manifold according to claim 6, wherein the plurality of removable manifolds comprises a secondary barrel-mounted manifold comprising a secondary fluid flow port in fluid communication with the spindle conduit, the rotary manifold further comprising a seal between the spindle and the secondary barrel-mounted manifold, the seal configured to prevent the secondary fluid from flowing out of the secondary barrel-mounted manifold outside the spindle conduit, the seal permitting rotation between the spindle conduit and the secondary barrel-mounted manifold about the central axis.

8. The rotary manifold according to claim 7, wherein the seal is concentric with the central axis.

9. The rotary manifold according to claim 7, further comprising a rotary electrical connector between the spindle and the secondary barrel-mounted manifold.

10. The rotary manifold according to claim 7, wherein the portion comprises a tube extending into the secondary barrel-mounted manifold and the seal is mounted on the tube in the secondary barrel-mounted manifold.

11. The rotary manifold according to claim 10, wherein the tube is made of stainless steel and the secondary fluid comprises a corrosive liquid for stump treatment.

12. The rotary manifold according to claim 7, wherein the spindle conduit comprises a tube separate from but mounted on the spindle, the tube rotating with the spindle, the tube passing through the spindle into the secondary barrel-mounted manifold, and wherein the seal is mounted on the tube in the secondary barrel-mounted manifold.

13. The rotary manifold according to claim 7, further comprising a rotary position encoder mounted on the secondary barrel-mounted manifold and operatively engaged with the portion of the spindle conduit to encode rotation of the spindle.

14. The rotary manifold according to claim 6, further comprising a rotary position encoder mounted on a barrel-side of the rotary manifold and operatively engaged with the portion of the spindle conduit to encode rotation of the spindle.

* * * * *